(12) United States Patent
Mazurenko et al.

(10) Patent No.: US 8,804,946 B2
(45) Date of Patent: Aug. 12, 2014

(54) STOCHASTIC VECTOR BASED NETWORK ECHO CANCELLATION

(75) Inventors: Ivan L. Mazurenko, Khimki (RU); Dmitry N. Babin, Moscow (RU); Denis V. Parkhomenko, Mytischy (RU); Alexander A. Petyushko, Bryansk (RU); Denis V. Parfenov, Moscow (RU)

(73) Assignee: LSI Corporation, San Jose, CA (US)

( * ) Notice: Subject to any disclaimer, the term of this patent is extended or adjusted under 35 U.S.C. 154(b) by 70 days.

(21) Appl. No.: 13/233,417

(22) Filed: Sep. 15, 2011

(65) Prior Publication Data

US 2012/0224686 A1 Sep. 6, 2012

(30) Foreign Application Priority Data

Mar. 1, 2011 (RU) ................................ 2011107596

(51) Int. Cl.
*H04B 3/23* (2006.01)

(52) U.S. Cl.
USPC .................................. 379/406.08; 381/71.11

(58) Field of Classification Search
USPC ................ 379/406.01–406.16; 370/286–292; 381/71.1–71.14, 94.1–94.9
See application file for complete search history.

(56) References Cited

U.S. PATENT DOCUMENTS

| | | | | |
|---|---|---|---|---|
| 5,995,620 | A * | 11/1999 | Wigren ..................... | 379/406.09 |
| 6,678,376 | B1 * | 1/2004 | Takahashi et al. ........ | 379/406.01 |
| 6,950,842 | B2 * | 9/2005 | Lis ................................ | 708/322 |
| 7,433,908 | B2 | 10/2008 | Tanrikulu et al. ............. | 708/322 |
| 2003/0140075 | A1 * | 7/2003 | Lis ................................. | 708/322 |
| 2004/0260738 | A1 * | 12/2004 | Kablotsky et al. ............ | 708/322 |
| 2006/0251243 | A1 * | 11/2006 | Tanrikulu et al. ........ | 379/406.08 |
| 2008/0253553 | A1 * | 10/2008 | Li et al. ..................... | 379/406.05 |
| 2012/0224686 | A1 * | 9/2012 | Mazurenko et al. ...... | 379/406.09 |

OTHER PUBLICATIONS

Parallel NLMS Filterswith Stochastic Active Taps and Step-Sizes for Sparse System Identification, Yancheng Li , Yuantao Gu, and Kun Tang , 2006 IEEE.*

D.L. Duttweiler, "Proportionate Normalized Least-Mean_Squares Adaptation in Echo Cancellers", IEEE Trans. On Speech and Audio Processing, vol. 8, No. 5, pp. 508-518, Sep. 2000.

K. Dogancay and O. Tanrikulu, "Adaptive Filtering Algorithms With Selective Partial Updates", IEEE Transactions on Circuits and Systems-II: Analog and Digital Signal Processing, vol. 48, No. 8, pp. 762-769, Aug. 2001.

"International Telecommunication Union, Digital Network Echo Cancellers", ITU-T Recommendation G.168, 112 pages, Apr. 2000.

(Continued)

*Primary Examiner* — Fan Tsang
*Assistant Examiner* — Akelaw Teshale
(74) *Attorney, Agent, or Firm* — Christopher P. Maiorana, PC

(57) ABSTRACT

An apparatus generally having a first circuit and a second circuit is disclosed. The first circuit may be configured to generate a first sample by filtering an input vector based on (a) a filter vector and (b) a stochastic vector. Each of a plurality of components in the stochastic vector generally has a respective random value. The first circuit may also be configured to generate a second sample as a difference between a third sample and the first sample. The third sample may be received from a network as an echo. The second circuit may be configured to update a subset of a plurality of taps of the filtering where a corresponding one of the components of the stochastic vector has a first value of the random values.

20 Claims, 5 Drawing Sheets

(56) References Cited

OTHER PUBLICATIONS

S.L. Gay and S. Tavathia, "The Fast Affine Projection Algorithm", in Proc. ICASSP, pp. 3023-3026, 1995.

J.M. Cioffi and T. Kailath, "Fast Recursive-Least-Square Transversal Filters for Adaptive Filtering", IEEE Trans. Acoust, Speech and Sig.Proc., vol. ASSP-32, pp. 304-337, Apr. 1984.

* cited by examiner

STOCHASTIC VECTOR BASED NETWORK ECHO CANCELLATION

This application claims the benefit of Russian Application No. 2011107569, filed Mar. 1, 2011 and is hereby incorporated by reference in its entirety.

FIELD OF THE INVENTION

The present invention relates to echo cancellation in an acoustic network generally and, more particularly, to a method and/or apparatus for implementing a stochastic vector based network echo cancellation.

BACKGROUND OF THE INVENTION

A number of technical areas currently exist where digital signal processing, and in particular, adaptive filtering is used. The technical areas include network and acoustic echo cancellation, channel equalization, noise reduction used in cellular and hands-free telephones, teleconference systems and IP telephony. Issues arise while trying to reduce a given amount of an undesirable echo by modeling the echo on the basis of single-side speech and a known echo. Linear adaptive filtering techniques are normally used to solve the problem.

Different approaches exist to adjust the linear adaptive filtering using adaptation techniques. Choice of a concrete adaptation technique and corresponding input and runtime parameters affect the performance of the whole system. A commonly used technique of adapting filtering is a Normalized Least Mean Square (NLMS) technique. However, the convergence rate of the NLMS technique is slow. Other techniques currently in use either are numerically intensive (i.e., the Affine Projection Algorithm (APA)) or have numerical problems (i.e., the Recursive Least Mean Squares (RLS) technique). Multi-segmental filter coefficient approaches are used in practical implementations to reduce the overall system load and to increase convergence speed. However, such approaches use additional computations dealing with multiple window segment boundaries.

A typical situation for real environments, like network echo canceling systems, supposes a variable Millions of Instructions Per Second (MIPS) processor budget for each signal channel. The budget depends mostly on a current overall system load (i.e., number of active channels and peak numerical performance of each channel). Therefore, problems arise controlling a balance between (i) convergence speed and quality and (ii) the MIPS utilized in each voice channel.

The network echo cancellation problems are characterized by long echo path impulse responses, only small portions of which relate to basic sound reflections (i.e., filter windows) that contain filter energy. Nevertheless, the adaptive echo cancellers are designed to synthesize the full echo path because the actual locations of filter windows (including starting delay) of the echo path is unknown.

The NLMS technique gives echo vector estimates on a sample-by-sample basis so that a normalized mean square error (i.e., $e(k)$) is minimized in a least mean square sense according to the following set of formulae:

$$y(k)=w^T(k)X(k);$$

$$e(k)=d(k)-y(k); \text{ and}$$

$$w(k+1)=w(k)+\mu e(k)X(k)/(X^T(k)X(k)).$$

The variable $d(k)$ is an echo sample received by the canceller, $w(k)=[w_0(k), w_1(k), \ldots, w_{(N-1)}(k)]^T$ is an N sample long echo path estimate vector, $\mu$ is the step-size parameter and $X(k)$ is a vector representing the last N input samples: $X(k)=[x(k-N+1), \ldots, x(k)]^T$. The vector w is initialized as $w(1)=[0, \ldots 0]$.

Computational complexity of a step of the NLMS technique is $2N+2$ multiplications, where an N corresponds to a filter update phase of the NLMS technique, the other N corresponds to filtering stage and $X^T(k+1)X(k+1)$ can be obtained from $X^T(k)X(k)$ by means of two additional multiplications as follows: $X^T(k+1)X(k+1)=X^T(k)X(k)+x(k)^2-x(k-N+2)^2$. The computational complexity of the NLMS technique is less than that of the APA, Fast Affine Projection (FAP) and the RLS techniques. However, the NLMS technique shows a slower convergence rate when using test vectors according to an ITU-T Recommendation G.168.

Another adaptive filtering technique is a Proportionate Normalized Least Mean Square (PNLMS). The PNLMS technique is defined by a set of formulae as follows:

$$y(k)=w^T(k)X(k);$$

$$e(k)=d(k)-y(k); \text{ and}$$

$$w(k+1)=w(k)+\mu G(k)e(k)X(k)/(X^T(k)G(k)X(k))$$

where G is a diagonal matrix with a diagonal vector g. The diagonal vector g is almost proportional to the vector $w(k)$. More precisely, the diagonal vector g is computed using the following formulae:

$$L_\infty(k)=\max\{\delta_p, |w_0(k)|, |w_1(k)|, \ldots, |w_{(N-1)}(k)|\};$$

$$\gamma_i(k)=\max\{\rho L_\infty(k), |w_i(k)|\}, 0 \leq i \leq N-1; \text{ and}$$

$$g_i(k)=\gamma_i(k)/\Sigma\gamma_i(k)$$

where $\delta_p=0.01$ and $\rho=5/N$. The complexity of the PNLMS technique is 6N per step. The convergence rate of the PNLMS technique is twice as fast as the convergence rate of the NLMS technique. Assuming $G=I$ (i.e., I is an identity matrix), the PNLMS technique performs the same as the NLMS technique.

Although a length of the vector $w(k)$ is large (i.e., about 1000 components), in practice the vector $w(k)$ consists of several windows with non-zero energy. All of the remaining components of vector $w(k)$ can be considered to have zero energy without significant loss of echo cancellation quality. Therefore, if a number (i.e., R) of non-zero samples of the vector $w(k)$ are known, the remaining samples are not updated. In such a case, the computational complexities of the NLMS technique and the PNLMS technique become 2R and 6R correspondingly. The complexity reduction leads to partial-update techniques that use less computational resources than the pure NLMS and PNLMS techniques. Furthermore, the partial-update techniques have acceptable convergence rates. Most known partial-update techniques assume that the additions of the vector $w(k+1)$ always consists of blocks of the same length (i.e., L), where $L=N/M$. Only some number (i.e., B) of the blocks have non-zero energy, where $B \leq M$. For example, a Selective Partial Update (SPU) technique is defined by the following set of formulae:

$$y(k)=w^T_{IB}(k)X(k);$$

$$e(k)=d(k)-y(k); \text{ and}$$

$$w_{IB}(k+1)=w_{IB}(k)+\mu G_{IB}(k)x_{IB}(k)e(k)/(x^T_{IB}(k)G_{IB}(k)x_{IB}(k))$$

where $IB=\{i: x^T_1(k)G_i(k)x_1(k)$ is one of the B largest among $x^T_1(k)G_1(k)x_1(k), \ldots, x^T_M(k)G_M(k)x_M(k)\}$.

The computational complexity of the SPU+PNLMS technique can be shown to be BL+5N+M $\log_2$ (M). The last component of the complexity corresponds to the complexity of selecting B blocks having the largest weights (i.e., defining the set IB). Note that an update of the matrix G still occurs at every step of the technique. A such, the above generalization of the PNLMS technique is not efficient from a computational point of view. The SPU+PNLMS technique works slightly faster than the PNLMS technique, but converges slower.

Assuming G=I, the SPU+PNLMS technique reduces to the SPU+NLMS technique, which is a generalization of the NLMS technique based on a selective partial update approach. Without taking into account the complexity of searching for an optimal set of the blocks IB, the SPU+NLMS technique will have a complexity of about BL+N. The overall computational complexity of the SPU+NLMS technique will be B(L+2)+N+M $\log_2$ (M). Reduction of the complexity occurs because block sorting is now based on weights (i.e., Vi) that can be efficiently updated. Denoting the weight of the i-th block of the input signal as $Vi=x(k-N+(i-1)\times L+1)^2+x(k-N+(i-1)\times L+2)^2+ \ldots +x(k-N+i\times L)^2$, each weight can be updated by two multiplications. The resulting complexity is less than 2N for some typical parameters B and M. For example, if N=1024, L=32, B=8 and M=32, the complexity of the SPU+NLMS technique will be 272+1024+160=1456 processor operations, while the complexity of the NLMS technique will be 2048 processor operations.

SUMMARY OF THE INVENTION

The present invention concerns an apparatus generally having a first circuit and a second circuit. The first circuit may be configured to generate a first sample by filtering an input vector based on (a) a filter vector and (b) a stochastic vector. Each of a plurality of components in the stochastic vector generally has a respective random value. The first circuit may also be configured to generate a second sample as a difference between a third sample and the first sample. The third sample may be received from a network as an echo. The second circuit may be configured to update a subset of a plurality of taps of the filtering where a corresponding one of the components of the stochastic vector has a first value of the random values.

The objects, features and advantages of the present invention include providing a stochastic vector based network echo cancellation that may (i) reduce a complexity of processor operations, (ii) provide a partial update method, (iii) converge faster than conventional methods and/or (iv) improve a quality to complexity ratio.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
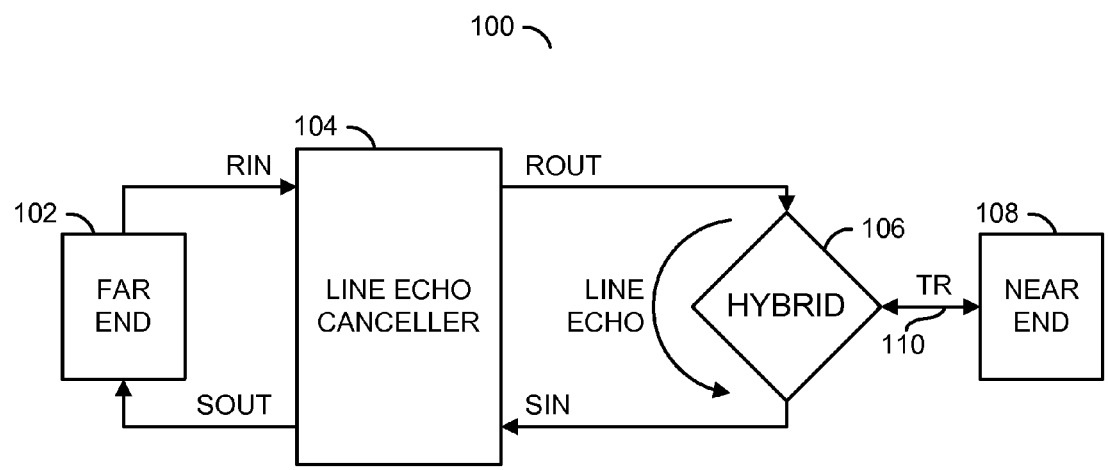
FIG. 1 is a block diagram of a system.

Referring to FIG. 1, a block diagram of a system 100 is shown. The system (or architecture) generally comprises a block (or circuit) 102, a block (or circuit) 104, a block (or circuit) 106, a block (or circuit) 108 and a network (or transmission line) 110. The circuits 102 to 110 may represent modules and/or blocks that may be implemented as hardware, firmware, software, a combination of hardware, firmware and/or software, or other implementations. The system 100 may be configured to perform a stochastic vector based network echo cancellation. The term "stochastic" generally means involving a random variable and/or involving a chance or probability. The stochastic property may be used in the system 100 at least in the form of a vector having components with random values.

A signal (e.g., RIN) may be generated by the circuit 102 and received by the circuit 104. The circuit 104 may generate a signal (e.g., SOUT) received by the circuit 102. A signal (e.g., ROUT) may be generated by the circuit 104 and transferred to the circuit 106. The circuit 106 may generate a signal (e.g., SIN) that is received by the circuit 104. A bidirectional signal (e.g., TR) is generally exchanged between the circuit 106 and the circuit 108 via the network 110.

The circuit 102 generally implements a far end circuit. The circuit 102 may be operational to send and receive data to and from the circuit 108. The receive data may be received by the circuit 102 from a "far" user of the system 100. The far user is generally located proximate (or adjacent) the circuit 102. The send data may be sent to the far user by the circuit 102. In a receive path, the receive data may initially be transferred from the circuit 102 to the circuit 104 in the signal RIN. From the circuit 104, the receive data may be presented to the circuit 106 in the signal ROUT. From the circuit 106, the receive data may be transferred via the network 110 in the signal TR and finally received by the circuit 108. In a send path, the send data is generally sent by the circuit 108 to the circuit 106 in the signal TR. From the circuit 106, the send data may be presented to the circuit 104 in the signal SIN. The send data may finally be transferred from the circuit 104 to the circuit 102 in the signal SOUT.

The circuit 104 may implement a line echo cancelling circuit. The circuit 104 is generally operational to transfer data between the circuits 102 and 106, filter the data, perform network echo noise cancellation on the send data as received in the signal SIN, update the echo cancellation functionality to converge with the current echo characteristics of the network 110 and train the echo cancellation functionality to learn new echo characteristics. The network echo noise cancellation generally includes (i) generating a synthesized sample by filtering an input vector based on a filter vector and a stochastic vector, (ii) generating an output sample as a difference between an echo sample and the synthesized sample and (iii) updating a subset of a plurality of filter taps of the filtering where a corresponding one of the components of the stochastic vector has a particular value of the random values. Each of a plurality of components in the stochastic vector may have a respective random value.

The circuit 106 generally implements a hybrid circuit. The circuit 106 may be operational to route the receive data in the signal ROUT to the signal TR on the network 110 and route the send data in the signal TR to the signal SIN. In some embodiments, the circuit 106 may be implemented as a normal 4-wire to 2-wire hybrid circuit. The 2-wire interface generally connects to the network 110. Half of the 4-wire interface may receive the signal ROUT. The other half of the 4-wire interface may present the signal SIN. In some situations, the circuit 106 may leak some of the receive data from the signal ROUT to the signal SIN thereby adding to the echo.

The circuit 108 generally implements a near end circuit. The circuit 108 may be operational to communicate with the circuit 106 via the network 110. The receive data generated by the far user may be presented to a "near" user of the system 100 by the circuit 108. The near user may be located proximate (or adjacent) the circuit 108. The send data is generally received by the circuit 108 from the near user and transmitted to the far user at the circuit 102. In some embodiments, the circuit 108 may include a copy of the circuits 102, 104 and 106.

The network 110 may implement an acoustic network. In some embodiments, the network 110 may be a plain old telephone system telephone line. Other network designs may be implemented to meet the criteria of a particular application.

The network 110 may be considered to have a current condition among several possible conditions (or states or modes) at any given time. The possible conditions include, but not limited to, a talk condition, a listen condition, a double talk condition, a silence condition and a tone condition. In some circumstances, two or more of the conditions may exist on the network 110 at the same time (e.g., the tone condition and the talk condition where the far user speaks during the tone condition).

While in the talk condition, the far user is generally speaking and the near user may be silent. Since the only data on the network 110 in the talk condition originates from the circuit 102, the circuit 104 may (i) reduce an actual echo by applying synthesized echo cancellation data, (ii) update (converge) the echo cancellation functionality, (iii) detect changes in the echo path of the network 110 and (iv) train the echo cancellation functionality to match the echo path.

While in the listen condition, the near user may be speaking and the far user may be silent. While in the silent condition, both the far user and the near user may be silent. If the far user is silent, the signal ROUT generally contains little or no data that could create an echo. Therefore, circuit 104 may stop the echo cancellation, stop the updates of the echo cancellation functionality, stop any training in progress and route the signal SIN to the signal SOUT without applying the echo cancellation.

While in the double talk condition, both the far user and the near user may be speaking. Since the circuit 104 cannot distinguish far user data from near user data in the signal SIN under the double talk condition, circuit 104 may stop updating the echo cancellation functionality, stop any training in progress and route the signal SIN to the signal SOUT without applying any echo cancellation. In some situations, the echo cancellation may continue while in the double talk condition as the circuit 104 may reasonably estimate the echo components in the signal SIN caused by the outgoing data in the signal ROUT. While in the tone condition, the signal TR generally carries a continuous tone. While the tone is present on the network 110, the circuit 104 generally stops the echo cancellation, stops the updating of the echo cancellation functionality and stops any training that may be in progress.

Figure 2:
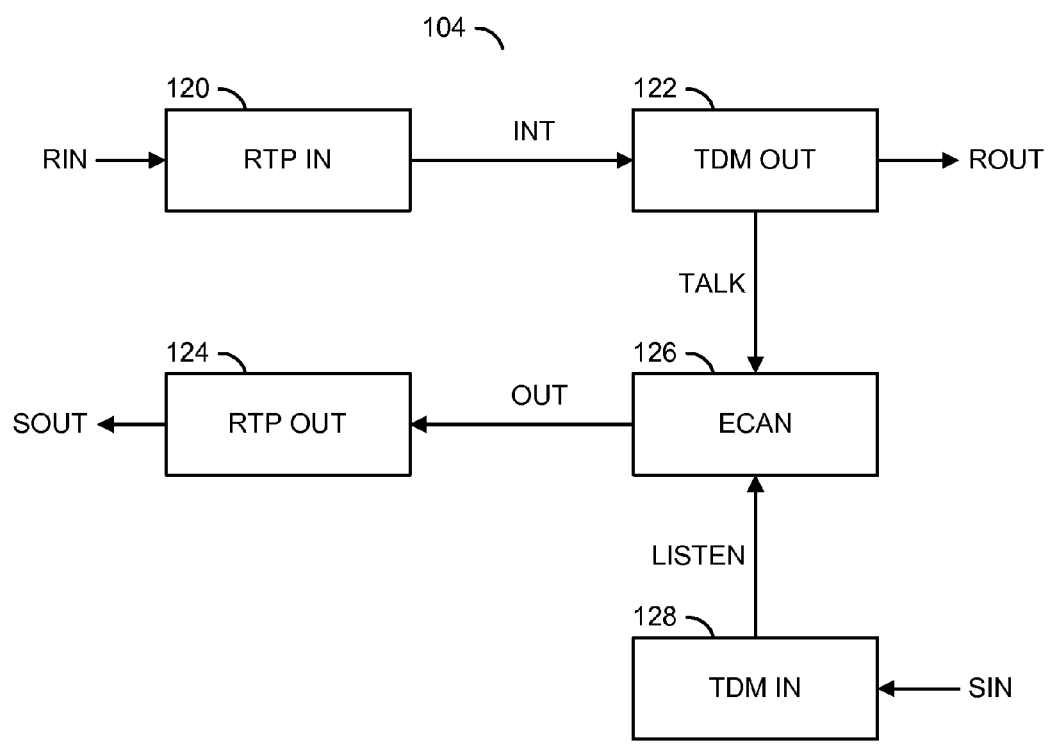
FIG. 2 is a block diagram of an example implementation of a line echo cancelling circuit in the system.

Referring to FIG. 2, a block diagram of an example implementation of the line echo cancelling circuit 104 is shown. The circuit (or device, apparatus or integrated circuit) 104 generally comprise a block (or circuit) 120, a block (or circuit) 122, a block (or circuit) 124, a block (or circuit) 126 and a block (or circuit) 128. The circuits 120 to 128 may represent modules and/or blocks that may be implemented as hardware, firmware, software, a combination of hardware, firmware and/or software, or other implementations.

The circuit 120 generally receives the signal RIN. A signal (e.g., INT) may be generated by the circuit 120 and transferred to the circuit 122. The circuit 122 may generate the signal ROUT. A signal (e.g., TALK) may be generated by the circuit 122 and received by the circuit 126. The circuit 128 generally receives the signal SIN. A signal (e.g., LISTEN) may be generated by the circuit 128 and presented to the circuit 126. The circuit 126 may generate a signal (e.g., OUT) that is transferred to the circuit 124. The circuit 124 may generate the signal SOUT.

The circuit 120 generally implements a receiver circuit. The circuit 120 may be operational to (i) receive the data from the signal RIN and (ii) convert the data into an intermediate format. While in the signal RIN, the data is generally coded per a local protocol. In some embodiments, the local protocol may be a Real-time Transport Protocol (RTP). The intermediate format is generally suitable for use by the other circuits within the circuit 104. Data in the intermediate format may be presented in the signal INT to the circuit 122. Other protocol conversions may be implemented to meet the criteria of a particular application.

The circuit 122 generally implements a converter circuit. The circuit 122 may be operational to (i) convert the data from the intermediate format and (ii) transmit the data in the signal ROUT. While in the signal ROUT, the data may be coded per a network protocol. In some embodiments, the network protocol may be a Time Domain Modulation (TDM) protocol. Data in the modulation protocol is presented to the circuit 106 in the signal ROUT. Other protocol conversions may be implemented to meet the criteria of a particular application. The circuit 122 may be further operational to transfer the data received in the signal INT to the circuit 126 via the signal TALK. The data in the signal TALK may be representative of the data when transmitted on the network 110 from the circuit 106.

The circuit 124 may implement another converter circuit. The circuit 124 is generally operational to (i) convert the data received in the signal OUT and (ii) transmit the data in the signal SOUT. While in the signal SOUT, the data is generally coded per the local protocol (e.g., same protocol as the signal RIN). Other protocol conversions may be implemented to meet the criteria of a particular application.

The circuit 126 generally implements an echo cancelling (ECAN) circuit. The circuit 126 may be operational to detect the condition of the network 110, model an echo path of the network 110 as seen from the circuit 106, cancel echoes within the signal SIN, update the echo cancellation functionality and train the echo cancellation functionality. The echo cancelled data may be presented in the signal OUT to the circuit 124.

The circuit 128 may implement another receiver circuit. The circuit 128 is generally operational to (i) receive the data from the signal SIN and (ii) convert the data into the intermediate format. While in the signal SIN, the data may be coded per the network protocol (e.g., same protocol as the signal ROUT). The data is generally presented in the signal LISTEN to the circuit 126. Other protocol conversions may be implemented to meet the criteria of a particular application.

Figure 3:
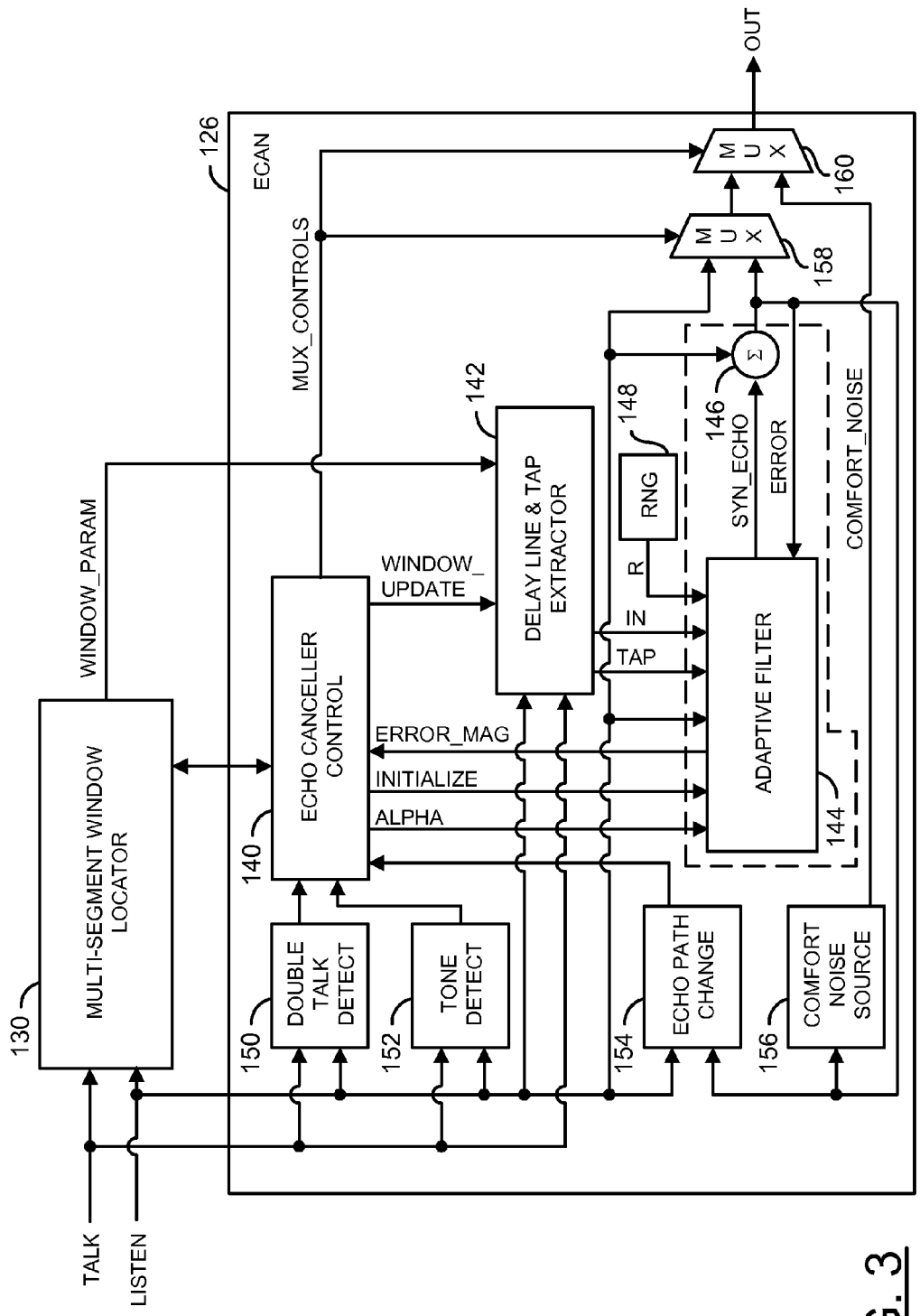
FIG. 3 is a detailed block diagram of the line echo cancelling circuit.

Referring to FIG. 3, a detailed block diagram of the circuit 126 is shown with an accompanying block (or circuit) 130. The circuit (or module, device, apparatus or integrated circuit) 126 generally comprises a block (or circuit) 140, a block (or circuit) 142, a block (or circuit) 144, a block (or circuit) 146, a block (or circuit) 148, a block (or circuit) 150, a block (or circuit) 152, a block (or circuit) 154, a block (or circuit) 156, a block (or circuit) 158 and a block (or circuit) 160. The circuits 130 to 160 may represent modules and/or blocks that may be implemented as hardware, firmware, software, a combination of hardware, firmware and/or software, or other implementations.

Each signal TALK and LISTEN may be received by the circuits 130, 142, 150, 152 and 154. The signal LISTEN may also be received by the circuits 144, 146 and 158. The circuit 160 may generate and presented the signal OUT. A signal (e.g., MU) may be generated by the circuit 140 and presented to the circuit 144. A signal (e.g., INITIALIZE) may be generated by the circuit 140 and presented to the circuit 144. The circuit 144 may generate a signal (e.g., ERROR_MAG) received by the circuit 140. A signal (e.g., IN) may be generated by the circuit 142 and received by the circuit 144. The circuit 142 may generate a signal (e.g., TAP) received by the circuit 144. A signal (e.g., R) may be generated by the circuit 148 and received by the circuit 144. The circuit 144 may generate a signal (e.g., SYN_ECHO) transferred to the circuit 146. The circuit 146 may generate a signal (e.g., ERROR) received by the circuits 144, 154, 156 and 158. A signal (e.g., WINDOW_PARAM) may be generated by the circuit 130 and received by the circuit 142. The circuit 140 may generate a signal (e.g., MUX_CONTROLS) that is presented to the circuits 158 and 160. The circuit 140 may generate a signal (e.g., WINDOW_UPDATE) that is transferred to the circuit 142. A signal (e.g., COMFORT_NOISE) may be generated by the circuit 156 and received by the circuit 160. Each circuit 150, 152 and 154 may present a respective signal to the circuit 140. The circuits 140 and 130 may be in communication with each other by a set of several signals.

The circuit 130 generally implements a multi-segment window locator circuit. The circuit 130 may be operational to generate parameters for a multi-segment window based on the data received in the signal TALK and LISTEN. The window parameters may be used to bound a number of input samples used in the echo cancellation. The parameters may be presented to the circuit 142 via the signal WINDOW_PARAM. In some embodiments, the circuit 130 may be switched off (deactivated) while an initial adaptation is being performed. Thereafter, the circuit 130 may be switched on (activated) to find the windows and then switched off again. Similarly, after each echo path change event is detected, the circuit 130 may be switched on to find the windows and then switched off again. Having the circuit 130 switched off generally saves significant processing resources with the present adaptation technique.

The circuit 140 generally implements an echo canceller control circuit. The circuit 140 may be operational to control the overall operations to the circuits 126 and 130. The circuit 140 may control the circuits 158 and 160 based on the current condition of the network 110. Updates to the window may be calculated by the circuit 140 and presented to the circuit 142 via the signal WINDOW_UPDATE. To initialize the circuit 144, the circuit 140 may assert the signal INITIALIZE. The signal MU may be generated by the circuit 140 and presented to the circuit 144 to convey the step-size parameter µ. A magnitude of an error between the synthesized echo and the actual echo may be received by the circuit 140 from the circuit 142 via the signal ERROR_MAG.

The circuit 142 may implement a delay line and tap extractor circuit. The circuit 142 is generally operational to buffer a sequence of multiple (e.g., N) input samples from the signal TALK. The samples generally form the input vector X(k). The input vector X(k) may be presented from the circuit 142 to the circuit 144 in the signal IN. The circuit 142 may also be operational to extract tap values based on the window parameters received in the signal WINDOW_PARAM and update information received in the signal WINDOW_UPDATE. The tap values are generally transferred from the circuit 142 to the circuit 144 in the signal TAP.

The circuit 144 generally implements an adaptive filter circuit. The circuit 144 may be operational to filter the input data received in the signal LISTEN to generate a synthesized echo that approximately mimics the echo caused by the network 110 and, possibly in part, by the circuit 106. The adaptive filtering is generally based on the tap values received in the signal TAP, the input vector X(k) received in the signal IN, an error value received in the signal ERROR and a set of optional random numbers received from the circuit 148 in the signal R.

The circuit 146 generally implements a difference circuit. The circuit 146 may be operational to generate a difference between the synthesized echo received in the signal SYN_ECHO and the actual echo as received in the signal LISTEN. The difference may be the error value in the signal ERROR. In some embodiments, the circuit 146 may be implemented as part of the circuit 144 (see dashed box).

The circuit 148 generally implements a random number generator circuit. The circuit 148 may be operational to generate one or more sets of random values in the signal R. In some embodiments, the circuit 148 may be implemented as a normal pseudorandom number generator. In other embodiments, the circuit 148 may be implemented as a memory containing pre-calculated random values. Each random value may have either a logical one (or digital high) value or a logical zero (or digital low) value.

The circuit 150 generally implements a double talk detection circuit. The circuit 150 may be operational to detect when both the far user and the near user are speaking. Detection of the double talk condition by the circuit 150 may be reported to the circuit 140.

The circuit 152 generally implements a tone detection circuit. The circuit 152 may be operational to detect when one or more specified tones reside on the network 110. Detection of the tone condition by the circuit 152 may be reported to the circuit 140.

The circuit 154 generally implements an echo path change detection circuit. The circuit 154 may be operational to detect when the echo path of the network 110 has experienced a significant change. The detection is generally based on large error values in the signal ERROR while echoes are present in the signal LISTEN. Detection of an echo path change by the circuit 154 may be reported to the circuit 140. The circuit 140 may respond to the report by initiating a training session to learn the modified echo path.

The circuit 156 generally implements a comfort noise source circuit. The circuit 156 may be operational to generate comfort noise in the signal COMFORT_NOISE. The comfort noise may be routed to the signal OUT during the silent condition so that the far user hears something. Otherwise, if the far user hears complete silence, the far user typically concludes that a connection to the near user has been dropped.

The circuit 158 generally implements a multiplexer circuit. The circuit 158 may be operational to route either (i) the filtered and echo-cancelled send data from the circuit 146 or (ii) bypass the filtering and route the send data directly to the circuit 160. Control of the routing is generally provided by the circuit 140 via the signal MUX_CONTROLS.

The circuit 160 generally implements another multiplexer circuit. The circuit 160 may be operational to route to the signal OUT either (i) the send data from the circuit 158 or (ii) the comfort noise from the circuit 156. Control of the routing may be provided by the circuit 140 via the signal MUX_CONTROLS.

Figure 4:
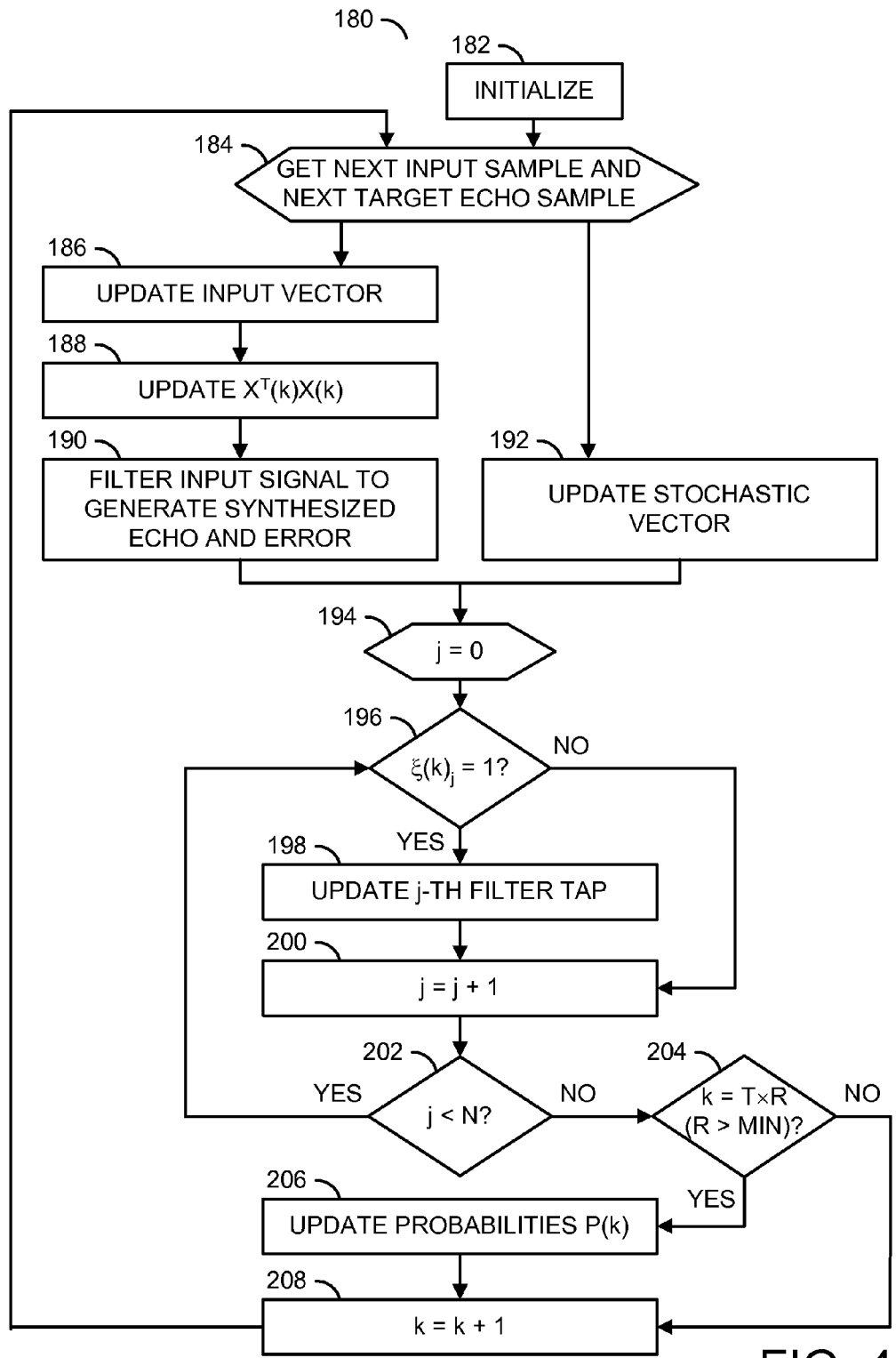
FIG. 4 is a flow diagram of a method for echo cancellation in accordance with a preferred embodiment of the present invention.

Referring to FIG. 4, a flow diagram of a method 180 for echo cancelling is shown in accordance with a preferred embodiment of the present invention. The method (or process or technique) 180 generally illustrates echo cancellation processing at sample indices k, for k=0, 1, 2, ..., etc. The method 180 generally comprises a step (or state) 182, a step (or state) 184, a step (or state) 186, a step (or state) 188, a step (or state) 190, a step (or state) 192, a step (or state) 194, a step (or state) 196, a step (or state) 198, a step (or state) 200, a step (or state) 202, a step (or state) 204, a step (or state) 206 and a step (or state) 208. The steps 182 to 208 may represent modules and/or blocks that may be implemented as hardware, firmware, software, a combination of hardware, firmware and/or software, or other implementations.

The method 180 may be implemented by the circuit 104 and/or 126. The method 180 may exceed existing techniques (e.g., NLMS, PNLMS, SPU+PNLMS, SPU+NLMS) in the sense of a quality to complexity ratio. The filter (or echo path estimation) vector w(k) generally comprises the M blocks each of the length L, where N is a number of components in the filter vector w(k) and LM=N. At each step (index) k, a partial update of the filter vector w(k) may be achieved by updating the number B among the M blocks. The number B is generally less than the number M.

In the step 182, the echo cancellation operations may be initialized by the circuit 140 asserting the signal INITIALIZE. Initial conditions for the echo cancellation vectors, values and index may be as follows:

$$W(0)=[0, \ldots, 0]^T;$$

$$P(0)=[B/M, B/M, \ldots, B/M];$$

$$X(-1)=[0, \ldots, 0]^T;$$

$$X^T(-1)X(-1)=0; \text{ and}$$

$$k=0$$

where the vector P(k) may be a probability vector and the vector X(k) may be an input (or talk) vector. The input vector X(k) generally represents the last N input (or talk) samples x(k). In the step 184, the circuit 142 may receive the next input sample value x(k) from the signal TALK and a next target echo sample (e.g., d(k)) from the signal LISTEN. The circuit 142 generally updates the input vector X(k) in step 186 as follows: $X(k)=[X(k-1)_{(1 \ldots N-1)}, x(k)]$. The updated input vector X(k) may be subsequently transferred to the circuit 144 in the signal IN. In the step 188, the circuit 144 generally updates a product of a transposed input vector and the input vector as follows: $X^T(k)=X^T(k-1)X(k-1)+x(k)^2-x(k-N)^2$.

In the step 190, the circuit 144 generally filters the signal LISTEN to generate a synthesized echo sample (e.g., y(k)) in the signal SYN_ECHO. The filtering may include the following computation: $y(k)=W^T(k)X(k)$. The circuit 146 generally uses the synthesized echo sample y(k) in step 190 to generate an echo prediction error sample (e.g., e(k)) as follows: $e(k)=d(k)-y(k)$.

While the echo prediction error sample is being calculated, a stochastic vector (e.g., $\xi(k)$) may be updated by the circuit 142 in the step 190. The stochastic vector $\xi(k)$ is generally defined as follows: $\xi(k)=[\xi_1(k), \ldots, \xi_1(k), \xi_2(k), \ldots, \xi_2(k), \ldots, \xi_M(k), \ldots, \xi_M(k)]$, where each component $\xi_i(k)$ has either a random value of logical zero or logical one. The components $\xi_i(k)$ may be generated such that a probability that $\xi_i(k)$ has the logical one value is as follows: probability $(\xi_i(k)=1)=p_i(k)$, for i=1, 2, ..., M, where probability values $p_i(k)$ may be the components of the probability vector P(k).

In the step 194, an index j may be reset to a zero count by the circuit 142. The circuit 142 generally checks a current component $\xi_j(k)$ in the step 196. If the current components $\xi_j(k)$ is a logical one (e.g., the YES branch of step 196), the circuit 142 may update a j-th filter tap for the circuit 144 in the step 198. The index j may be incremented in the step 200. If the current component $\xi_j(k)$ is a logical zero (e.g., the NO branch of step 196), the circuit 142 generally bypasses the updating of the corresponding filter tap and increments the index j in the step 200.

A check may be performed in the step 202 to see if all of the components $\xi_j(k)$ have been considered. If the index j is less than the value N (e.g., the YES branch of the step 202), the method 180 may return to the step 196 and examine the next component $\xi_j(k)$. Once the index j reaches the value N (e.g., the NO branch of the step 202), the circuit 142 may check to see if the probability components in the vector P(k) should be updated. If the index k matches a product of a step-size value (e.g., T) and a number of non-zero samples (e.g., R) (e.g., the YES branch of the step 204), the circuit 142 generally updates the probability vector P(k) in the step 206. The value R may be greater than a predetermined minimum value (e.g., MIN). If the index k is less than the above product (e.g., the NO branch of the step 204), the method 180 generally continues to the step 208.

The updating of the vector P(k) is generally described as follows. A vector (e.g., $H_i(k)$) may be a norm of the i-th block of the filter vector w(k). A vector (e.g., S(k)) may be a norm of the filter vector w(k) for i=1, 2, ..., M. A vector (e.g., m(k)) generally contains the maximum values of $H_i(k)$. Several values (e.g., a(k) and c(k)), a vector (e.g., $W_i(k)$) and the probability components $p_i(k)$ may be calculated by the circuit 142 in the step 200 as follows:

$$w(k)=[w_0(k), w_1(k), \ldots, w_{(N-1)}(k)]^T=[W_1(k), W_2(k), \ldots, W_M(k)];$$

$$W_i(k)=[w_{((i-1)\times L)}(k), w_{((i-1)\times L+1)}(k), w_{(i\times L-1)}(k)];$$

$$H_i(k)=|w_{((i-1)\times L)}(k)|+|w_{((i-1)\times L+1)}(k)|+ \ldots +|w_{(i\times L-1)}(k)|$$
$$\text{for } i=1,2,\ldots,M;$$

$$S(k)=H_1(k)+H_2(k)+ \ldots +H_M(k);$$

$$m(k)=\max(H_1(k), H_2(k), \ldots, H_M(k));$$

$$a(k)=L(Bm(k)-1)/(Nm(k)-L);$$

$$c(k)=(N-BL)/(Nm(k)-L); \text{ and}$$

$$p_i(k)=a(k)+c(k)H_i(k)/S(k).$$

The values a(k) and c(k) may be chosen so that $0<p_i(k)<1$ may be almost proportional to weights $H_i(k)$ of the filter blocks. The values a(k) and c(k) may also be chosen so that $p_1(k)+p_2(k)+ \ldots +p_M(k)=B$.

Recalling that LM=N, the components $\xi_i(k)$ may be stochastic variables having the logical zero values or the logical one value with probabilities $(\xi_i(k)=1)=p_i(k)$ for i=1, 2, ..., M. Therefore, a stochastic normalized least mean squares operation of the circuit 126 is generally defined by the following set of formulae:

$$y(k)=w^T(k)X(k);$$

$$e(k)=d(k)-y(k); \text{ and}$$

$$w(k+1)=w(k)+\mu e(k)(\xi(k)X(k))/(X^T(k)X(k))$$

where μ may be the step-size parameter.

On average, each realization of the stochastic vector $\xi(k)$ generally has BL components with the logical one values and the remaining components with the logical zero values. The vector $\xi(k)$ may be calculated by the circuit 142 based on the filter vector w(k). In the step 208, the index k may be incremented and the method 180 returns to the step 184 to get the next input sample and the next target echo sample.

The components of vector w(k) and, consequently, components of the vector ξ(k) generally change at a slow rate. Therefore, the vector ξ(k) may not be updated at each step of the echo cancelling process. Instead, the vector ξ(k) may be updated approximately every T-th step. The resulting lower update rate generally reduces the complexity to N+BL+(N+2M)/T.

In comparison with SPU+NLMS, the stochastic based method described above may not ignore small components of the filer vector w(k). Instead, the stochastic based method may update all of the components of the filter vector w(k), with the different components being updated with various frequencies.

In some embodiments, the stochastic vector ξ(k) may be generated and updated using a random number source. For example, a pseudorandom number generator (e.g., circuit 148) may be suitable to create the various components $ξ_i(k)$. In some embodiments, the circuit 148 may be implemented as a normal pseudorandom number generator. In other embodiments, a previously calculated pseudorandom sequence may be stored in a nonvolatile memory of the circuit 148. Updated random values may be read from the memory every T steps. Other sources of random numbers may be implemented to meet the criteria of a particular application.

Figure 5:
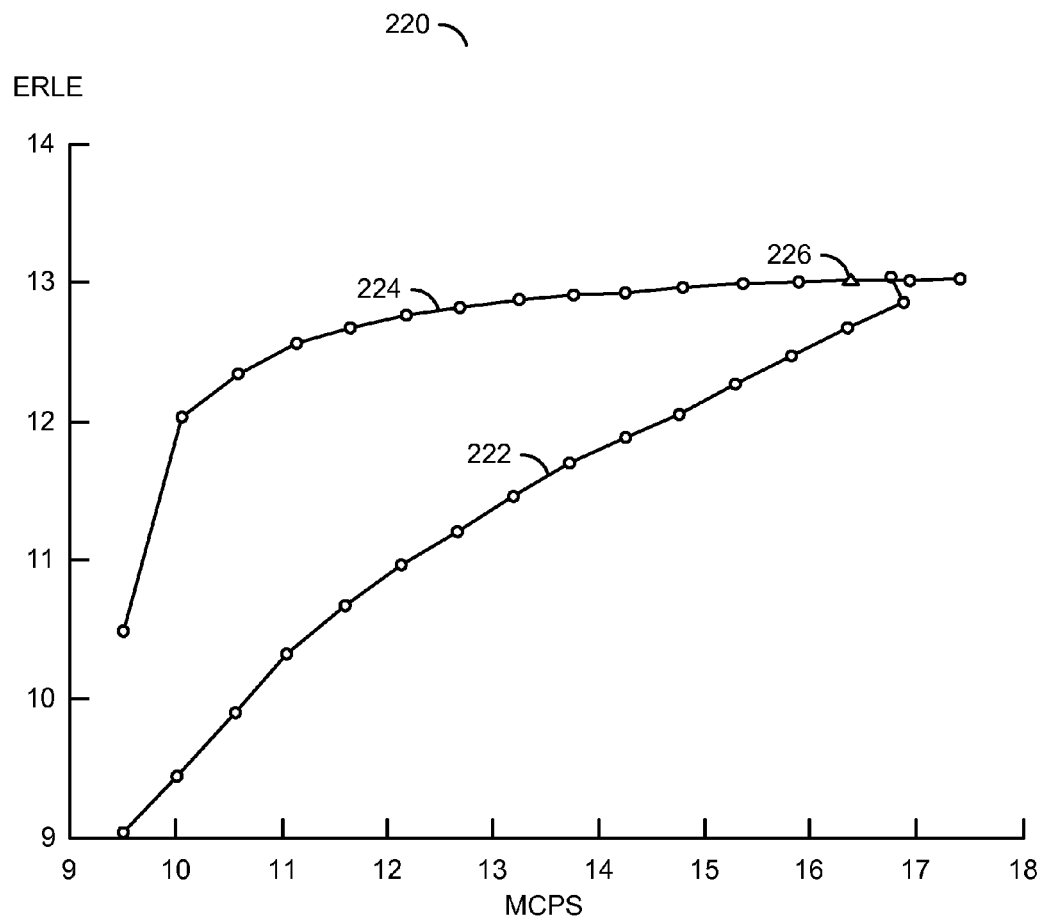
FIG. 5 is a graph illustrating multiple simulation results.

Referring to FIG. 5, a graph 220 illustrating multiple simulation results is shown. The simulation results generally compare 50 files from the ITU-T Recommendation G.168 with different settings. Common parameters used in the simulations may include N=1024 and L=64. A horizontal axis of the graph 200 generally represents a complexity (e.g., Millions of Cycles Per Second (MCPS)). A vertical axis of the graph 200 generally represents an Echo Return Loss Enhancement (ERLE) after 1 second. Points on the curves 222 and 224 may be related to different numbers of active blocks B=1, . . . , 16. The curve 222 generally corresponds to results of the SPU+NLMS process. The curve 224 generally shows the results of the method 180. A result for the NLMS process is shown as a point 226. As illustrated, method 180 (curve 224) may have almost the same accuracy as the NMLS (point 226) process while using approximately half as many MCPS of processing resources.

The system 100 may be operable to perform network and acoustic echo cancellation, channel equalization and/or noise reduction. The circuits 102, 104 and 106 may be implemented as part of land-line telephones, cellular telephones, hands-free telephones, teleconference systems and/or IP telephony.

The functions performed by the diagram of FIG. 4 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As would be apparent to those skilled in the relevant art(s), the signals illustrated in FIGS. 1-3 represent logical data flows. The logical data flows are generally representative of physical data transferred between the respective blocks by, for example, address, data, and control signals and/or busses. The system represented by the apparatus 100 may be implemented in hardware, software or a combination of hardware and software according to the teachings of the present disclosure, as would be apparent to those skilled in the relevant art(s).

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a first circuit configured to (i) generate a first sample by filtering an input vector through a filter based on both (a) a filter vector and (b) an intermediate vector, each of a plurality of components in said intermediate vector having a respective random value, and (ii) generate a second sample as a difference between a third sample and said first sample, said third sample being received from a network as an echo; and
   a second circuit configured to update a subset of a plurality of taps of said filter based on a corresponding one of said components of said intermediate vector that has a particular value, wherein a number of elements of said subset is greater than a predetermined minimum number.

2. The apparatus according to claim 1, wherein said filtering comprises a normalized least-mean-squares filtering modified by said intermediate vector.

3. The apparatus according to claim 1, wherein (i) said first circuit is further configured to update said second sample each step of said filter and (ii) said second circuit is further configured to update said intermediate vector each plurality of said steps.

4. The apparatus according to claim 1, wherein said second circuit is further configured to generate a plurality of probability values based on said filter vector.

5. The apparatus according to claim 4, wherein said second circuit is further configured to set each of said components selectively to either said particular value or another value based on a respective one of said probability values.

6. The apparatus according to claim 1, wherein (i) said first circuit is further configured to update said filter vector by adding a fourth vector and (ii) said fourth vector comprises a product of said intermediate vector and said input vector.

7. The apparatus according to claim 1, wherein said filter vector comprises a model of an echo path of said network.

8. The apparatus according to claim 1, wherein said input vector comprises a plurality of fourth samples transmitted on said network.

9. The apparatus according to claim 8, wherein said third sample is generated in response to one or more of said fourth samples.

10. The apparatus according to claim 1, wherein said apparatus is implemented as one or more integrated circuits.

11. A method for echo noise cancellation in a network, comprising the steps of:
    (A) generating a first sample by filtering an input vector through a filter based on both (i) a filter vector and (ii) an intermediate vector, each of a plurality of components in said intermediate vector having a respective random value;
    (B) generating a second sample as a difference between a third sample and said first sample, said third sample being received from said network as an echo; and
    (C) updating a subset of a plurality of taps of said filter based on a corresponding one of said components of said intermediate vector that has a particular value, wherein a number of elements of said subset is greater than a predetermined minimum number.

12. The method according to claim 11, wherein said filtering comprises a normalized least-mean-squares filtering modified by said intermediate vector.

13. The method according to claim 11, further comprising the steps of:
    updating said second sample each step of said filter; and
    updating said intermediate vector each plurality of said steps.

14. The method according to claim 11, further comprising the step of:
    generating a plurality of probability values based on said filter vector.

15. The method according to claim 14, further comprising the step of:
    setting each of said components selectively to either said particular value or another value based on a respective one of said probability values.

16. The method according to claim 11, further comprising the step of:
    updating said filter vector by adding a fourth vector, wherein said fourth vector comprises a product of said intermediate vector and said input vector.

17. The method according to claim 11, wherein said filter vector comprises a model of an echo path of said network.

18. The method according to claim 11, wherein said input vector comprises a plurality of fourth samples transmitted on said network.

19. The method according to claim 18, wherein said third sample is generated in response to one or more of said fourth samples.

20. An apparatus comprising:
    means for generating a first sample by filtering an input vector through a filter based on both (i) a filter vector and (ii) an intermediate vector, each of a plurality of components in said intermediate vector having a respective random value;
    means for generating a second sample as a difference between a third sample and said first sample, said third sample being received from a network as an echo; and
    means for updating a subset of a plurality of taps of said filter based on a corresponding one of said components of said intermediate vector that has a particular value, wherein a number of elements of said subset is greater than a predetermined minimum number.

* * * * *